United States Patent
Chen

(10) Patent No.: US 11,846,455 B2
(45) Date of Patent: Dec. 19, 2023

(54) VALVE NEEDLE ASSEMBLY AND ELECTRONIC EXPANSION VALVE HAVING THE VALVE NEEDLE ASSEMBLY

(71) Applicant: EMERSON CLIMATE TECHNOLOGIES (SUZHOU) CO., LTD., Jiangsu (CN)

(72) Inventor: Liang Chen, Suzhou (CN)

(73) Assignee: Copeland Climate Technologies (Suzhou) Co., Ltd., Jiangsu (CN)

( * ) Notice: Subject to any disclaimer, the term of this patent is extended or adjusted under 35 U.S.C. 154(b) by 295 days.

(21) Appl. No.: 17/053,723

(22) PCT Filed: May 8, 2019

(86) PCT No.: PCT/CN2019/085916
§ 371 (c)(1),
(2) Date: Feb. 15, 2021

(87) PCT Pub. No.: WO2019/214629
PCT Pub. Date: Nov. 14, 2019

(65) Prior Publication Data
US 2021/0239378 A1   Aug. 5, 2021

(30) Foreign Application Priority Data

May 8, 2018 (CN) .......................... 201810432862.X
May 8, 2018 (CN) .......................... 201820681836.6

(51) Int. Cl.
*F25B 41/35* (2021.01)
*F16K 1/38* (2006.01)
*F16K 1/52* (2006.01)

(52) U.S. Cl.
CPC ............. *F25B 41/35* (2021.01); *F16K 1/385* (2013.01); *F16K 1/523* (2013.01)

(58) Field of Classification Search
CPC ........ F25B 41/345; F25B 41/31; F25B 41/35; F16K 1/523; F16K 1/385
See application file for complete search history.

(56) References Cited

U.S. PATENT DOCUMENTS

| 5,419,531 A | * | 5/1995 | Hoehn | ...................... | F16K 1/38 |
| | | | | | 251/903 |
| 2009/0294713 A1 | * | 12/2009 | Harada | .................. | F25B 41/35 |
| | | | | | 251/129.15 |

(Continued)

FOREIGN PATENT DOCUMENTS

| CN | 102644785 A | 8/2012 |
| CN | 205745625 U | 11/2016 |

(Continued)

OTHER PUBLICATIONS

Translation of WO2014107998A1 retrieved from espacenet.com on Oct. 27, 2022. (Year: 2022).*

(Continued)

*Primary Examiner* — Jessica Cahill
(74) *Attorney, Agent, or Firm* — Harness, Dickey & Pierce, P.L.C.

(57) ABSTRACT

A valve needle assembly includes a valve stem, a valve needle, an elastic element, and a stop structure. The valve needle is connected to the valve stem and axially movable relative to the valve stem. The elastic element is provided between the valve stem and the valve needle. The stop structure is configured to limit axial movement of the valve needle relative to the valve stem so as to prevent the valve needle from prematurely opening the valve hole of the electronic expansion valve under the force of fluid. The electronic expansion valve includes the valve needle assembly.

20 Claims, 7 Drawing Sheets

(56) References Cited

U.S. PATENT DOCUMENTS

| | | | | |
|---|---|---|---|---|
| 2011/0120161 A1* | 5/2011 | Hayashi | ............... | F25B 41/38 |
| | | | | 62/160 |
| 2015/0107701 A1* | 4/2015 | Kuo | ................ | F16K 27/0209 |
| | | | | 137/538 |
| 2015/0122360 A1* | 5/2015 | Zhan | .................. | F16K 3/265 |
| | | | | 137/630.12 |

FOREIGN PATENT DOCUMENTS

| | | | |
|---|---|---|---|
| CN | 107356025 A | | 11/2017 |
| CN | 208431390 U | | 1/2019 |
| DE | 3240718 A1 | * | 5/1984 |
| GB | 1192695 A | | 5/1970 |
| JP | 200810611 A | | 1/2008 |
| SE | 335867 B | | 6/1971 |
| WO | WO-2014107998 A1 | * | 7/2014 ............ F16K 1/00 |

OTHER PUBLICATIONS

International Search Report (Chinese and English) and Written Opinion (Chinese) of the International Searching Authority issued in PCT/CN2019/085916, dated Jul. 29, 2019; ISA/CN.

\* cited by examiner

VALVE NEEDLE ASSEMBLY AND ELECTRONIC EXPANSION VALVE HAVING THE VALVE NEEDLE ASSEMBLY

CROSS-REFERENCE TO RELATED APPLICATIONS

This application is a U.S. National Phase Application under 35 U.S.C. 371 of International Application No. PCT/CN2019/085916 titled "VALVE NEEDLE ASSEMBLY AND ELECTRONIC EXPANSION VALVE HAVING THE VALVE NEEDLE ASSEMBLY" and filed on May 8, 2019, which claims the benefit of priorities to the following Chinese patent applications: Chinese patent application No. 201810432862.X, titled "VALVE NEEDLE ASSEMBLY AND ELECTRONIC EXPANSION VALVE HAVING THE SAME", filed with the China National Intellectual Property Administration on May 8, 2018; and Chinese patent application No. 201820681836.6, titled "VALVE NEEDLE ASSEMBLY AND ELECTRONIC EXPANSION VALVE HAVING THE SAME", filed with the China National Intellectual Property Administration on May 8, 2018, which are incorporated herein by reference in their entireties.

FIELD

The present application relates to a valve needle assembly and an electronic expansion valve having the same.

BACKGROUND

The contents of this section only provide background information related to this application, which may not constitute the prior art.

An electronic expansion valve is an important component in the refrigeration system, which is configured to adjust the flow rate of the working fluid. The electronic expansion valve generally includes a drive mechanism, a throttle mechanism and related auxiliary mechanisms. The drive mechanism generally includes a stepper motor and a corresponding screw pair mechanism. The throttle mechanism includes a valve needle assembly and a valve seat. In a conventional electronic expansion valve, the valve needle assembly is generally driven directly by the stepper motor and the screw pair mechanism to open or close the electronic expansion valve so as to achieve the adjustment of the flow rate of the fluid flowing through the electronic expansion valve. In order to ensure the reliable and efficient operation of the refrigeration system, the basic performance and reliability of the electronic expansion valve must be effectively ensured.

Currently, the valve needle assembly mainly adopts two designs, that is, a rigid connection design and a flexible connection design.

The valve needle assembly with rigid connection mainly adopts rigid connection means such as interference fit and so on, to assemble the related parts (such as the valve stem and the valve needle) of the valve needle assembly together. FIGS. 1 and 2 show a valve needle assembly M with rigid connection in the conventional technology. The valve needle assembly M includes a valve stem M1, a valve needle M2, and a sealing member M3. A threaded hole M11 is provided at an upper end of the valve stem M1 to connect a drive rod for driving the valve needle assembly M, for example, a drive shaft of a motor (not shown). A recess M12 is provided at a lower end of the valve stem M1. An upper portion M21 of the valve needle M2 is in interference fit with the recess M12, so that the valve needle M2 and the valve stem M1 integrally move up and down. A lower portion M22 of the valve needle M2 cooperates with a valve hole on a valve seat (not shown) to adjust an opening degree of the electronic expansion valve. In addition, a sealing member M3 is provided between the lower end of the valve stem M1 and the valve needle M2 to seal the valve needle assembly M against the valve seat (not shown).

However, during the operation of the electronic expansion valve, there may be position deviations among various parts of the electronic expansion valve that are caused by manufacturing errors and assembly errors of various parts, external force factors or vibration factors. Due to the interference fit between the valve stem M1 and the valve needle M2, the valve needle assembly M cannot provide appropriate axial flexibility or radial flexibility, so the valve needle assembly M with rigid connection cannot effectively adjust the position deviations caused by processing or assembling of the parts in actual movement, which tends to cause the valve needle assembly M to form hard contact with other parts (for example, the valve seat), so that the parts tends to get stuck in a certain position and bring about a jamming phenomenon, the electronic expansion valve fails to function, and friction occurs between the parts, which causes wearing, and affects the performance and service life of the electronic expansion valve. In order to avoid the above phenomenon as much as possible, higher requirements are put forward on the manufacturing accuracy of the parts and the performance of the motor of the electronic expansion valve, which increases the manufacturing cost of the electronic expansion valve.

Under the above background, the design of a valve needle assembly with flexible connection is proposed. The valve needle assembly with flexible connection mainly adopts elastic parts such as springs and so on, and the radial clearance fit between the valve needle and the valve stem, to allow that the axial position and radial position of the valve needle can be adjusted, thereby effectively reducing the adverse effects caused by position deviations due to processing or assembling of the parts. The flexible connection of the valve needle assembly makes the valve needle to form soft contact with the parts. If there are the above-mentioned position deviations, the valve needle can move relative to the valve stem, which avoids the above-mentioned jamming phenomenon, thereby completely eliminating or greatly reducing the above-mentioned adverse effects caused by position deviations. Therefore, the requirements on the manufacturing accuracy of the parts and the performance of the motor of the electronic expansion valve are lowered.

With the gradual development and application of electric buses and heat pumps, the practical system has an increasingly strong demand for a two-way function of the electronic expansion valve, and puts forward higher requirements on the electronic expansion valve. The electronic expansion valve is required to accurately regulate the flow rate in the two-way state, that is, the electronic expansion valve is required to serve as a two-way electronic expansion valve. In the electronic expansion valve having the conventional valve needle assembly with flexible connection, the adverse effects caused by position deviations due to processing or assembling of the parts can be effectively reduced by providing axial flexibility and radial flexibility through elastic parts such as springs and so on. However, since the electronic expansion valve does not control the axial flexibility, this kind of electronic expansion valve is compressed due to the flexibility of elastic parts such as springs and so on in the reverse state, especially in the reverse state of a large-diameter valve with large flow rate, causing that the valve needle has a certain opening degree relative to the valve seat when the electronic expansion valve is not opened, resulting in internal leakage and reducing the refrigeration efficiency in the reverse direction. Therefore, due to the structural limitation of the valve needle assembly itself, the performance requirements of the electronic expansion valve in the reverse state cannot be met as required.

Therefore, it is required to improve the performance of the electronic expansion valve with flexible connection in the reverse state, so that the electronic expansion valve can accurately regulate the flow rate and function normally in both the forward state and the reverse state.

SUMMARY

An object of the present application is to address or improve one or more of the above problems.

An aspect of the present application is to provide a valve needle assembly for an electronic expansion valve. The valve needle assembly comprises a valve stem, a valve needle, an elastic member and a stop structure. The valve stem is adapted to move in an axial direction under drive of a drive mechanism of the electronic expansion valve. The valve needle is coupled with the valve stem, so that the valve needle is movable in the axial direction relative to the valve stem. The elastic member is arranged between the valve stem and the valve needle, and is adapted to apply force to the valve needle. The stop structure comprises a first stopper arranged on the valve stem and a second stopper arranged on the valve needle. The first stopper and the second stopper are adapted to abut against each other so as to limit the valve needle from moving relative to the valve stem in a first direction of opening the electronic expansion valve to open the electronic expansion valve in a closed state of the electronic expansion valve.

In an embodiment, the valve needle assembly is configured so that: in the closed state of the electronic expansion valve, the first stopper and the second stopper are spaced apart by a predetermined axial gap, so that the valve needle is movable relative to the valve stem in the first direction to make the first stopper to abut against the second stopper, when the force of the fluid acting on the valve needle overcomes the force of the elastic member. In this way, it facilitates making full use of the axial flexibility of the electronic expansion valve. Alternatively, the valve needle assembly is configured so that: during the closing process of the electronic expansion valve, the valve stem moves relative to the valve needle in a second direction opposite to the first direction to make the first stopper to abut against the second stopper, so that in the closed state of the electronic expansion valve, the valve needle is prevented from moving in the first direction relative to the valve stem, when the force of the fluid acting on the valve needle overcomes the force of the elastic member. In this way, the reliable closing of the electronic expansion valve is completely ensured and the accidental opening of the electronic expansion valve is prevented.

In an embodiment, the first stopper is a valve stem connector fixed on the valve stem, and the second stopper is a sealing ring seat installed on the valve needle. The sealing ring seat and the valve needle are integrally movable in the axial direction. A valve hole sealing member is compressed between the sealing ring seat and the valve needle. In the closed state of the electronic expansion valve, the valve hole sealing member seals the valve hole of the electronic expansion valve.

In an embodiment, the valve needle assembly further includes an adjusting washer. The adjusting washer is fixed on the valve needle and is arranged between a lower end of the valve stem and the sealing ring seat in the axial direction. The valve needle assembly is configured so that: when the valve needle moves in the first direction relative to the valve stem to make the first stopper to abut against the second stopper, the adjusting washer abuts against the lower end of the valve stem to form an additional stop structure, or the adjusting washer and the lower end of the valve stem are spaced apart.

In an embodiment, the sealing ring seat is in clearance fit with the valve needle, and a lower end of the adjusting washer in the axial direction is able to abut against the sealing ring seat to make the sealing ring seat and the valve needle to integrally move in the axial direction.

In an embodiment, the first stopper is the lower end of the valve stem, and the second stopper is the adjusting washer fixed on the valve needle.

The valve needle assembly further includes a valve stem connector and a sealing ring seat. The valve stem connector is fixed on the valve stem, and the sealing ring seat is installed on the valve needle and located below the adjusting washer and the valve stem connector in the axial direction. The sealing ring seat and the valve needle are integrally movable in the axial direction. The valve needle assembly is configured so that: when the valve needle moves in the first direction relative to the valve stem to make the first stopper to abut against the second stopper, the valve stem connector abuts against the sealing ring seat to form an additional stop structure, or the valve stem connector and the sealing ring seat are spaced apart.

In an embodiment, the sealing ring seat is in clearance fit with the valve needle, and an axial lower end of the adjusting washer is able to abut against the sealing ring seat to make the sealing ring seat and the valve needle to integrally move in the axial direction.

A valve hole sealing member is compressed between the sealing ring seat and the valve needle. In the closed state of the electronic expansion valve, the valve hole sealing member seals the valve hole of the electronic expansion valve.

In an embodiment, the adjusting washer is provided with a first anti-detachment portion, and a second anti-detachment portion is provided at a lower end of the valve stem connector. The first anti-detachment portion is adapted to cooperate with the second anti-detachment portion to limit the valve needle from moving relative to the valve stem in a second direction opposite to the first direction.

In an embodiment, the first stopper is the lower end of the valve stem, and the second stopper is the valve needle connector fixed on the valve needle. The valve needle connector is integrally formed with an outer peripheral wall portion and a traverse wall portion, and the traverse wall portion divides the interior of the outer peripheral wall portion into an upper recess and a lower recess. The valve hole sealing member is installed in the lower recess, and the valve hole sealing member is compressed between the traverse wall portion and the valve needle. In the closed state of the electronic expansion valve, the valve hole sealing member seals the valve hole of the electronic expansion valve.

The first anti-detachment portion is provided at an axial upper end of the outer peripheral wall portion, and the second anti-detachment portion is provided on the valve stem. The first anti-detachment portion is adapted to cooperate with the second anti-detachment portion to limit the valve needle from moving relative to the valve stem in a second direction opposite to the first direction.

In an embodiment, at least part of the valve needle is arranged in an inner cavity of the valve stem.

In an embodiment, a valve needle passage is provided in the valve needle, and passes through the valve needle in the axial direction. A valve stem passage is provided in the valve stem, passes through the valve stem in the axial direction and is in fluid communication with the valve needle passage.

In an embodiment, an annular groove is provided on the valve needle, in which a chamber sealing member is provided, and the chamber sealing member is compressed between the valve needle and the valve stem.

An aspect of the present application is to provide an electronic expansion valve. The electronic expansion valve includes a valve seat, a drive mechanism and the valve needle assembly according to the present application. The valve seat includes a first port and a second port, one of the first port and the second port is used as a fluid inlet, and the other of the first port and the second port is used as a fluid outlet. The valve seat further comprises a first chamber and a valve hole, the first chamber is in fluid communication with the first port, and the first chamber is selectively in fluid communication with the second port through the valve hole. The drive mechanism is configured to drive the valve needle assembly to reciprocate to make the valve needle to cooperate with the valve hole so as to adjust the opening degree of the valve hole.

In an embodiment, the drive mechanism includes a motor. The motor includes a rotor and a stator, and the rotor is fixedly connected with a spindle. One end of the spindle is operatively connected with the valve needle assembly to drive the valve needle assembly to reciprocate. A second chamber is defined between the motor and the valve needle assembly, and a spindle passage is provided in the spindle. The spindle passage is in fluid communication with a valve stem passage formed in the valve stem and a valve needle passage formed in the valve needle to form a balance passage that communicates the second chamber with the second port.

According to the present application, the relative movement of the valve needle and the valve stem can be effectively limited by providing the stopper on the valve needle assembly, thereby restricting the axial flexibility of the valve needle. By means of the valve needle assembly and the electronic expansion valve according to the present application, it is possible to prevent the valve hole of the electronic expansion valve from being opened in advance under the force of the fluid and prevent the internal leakage caused thereby, thus ensuring that the electronic expansion valve can accurately regulate the opening degree of the valve hole both in the forward flow state of the fluid and in the reverse flow state of the fluid and function as a two-way electronic expansion valve. In addition, the valve needle assembly and the electronic expansion valve according to the present application can effectively balance the forces on the valve needle assembly during the movement by providing the balance passage, which can reduce the driving force required to drive the valve needle assembly.

BRIEF DESCRIPTION OF THE DRAWINGS

The embodiments of the present application will be described by way of example with reference to the accompanying drawings, in which the same features or components are denoted by the same reference signs and the drawings may be not necessarily drawn to scale, and wherein.

DETAILED DESCRIPTION OF THE EMBODIMENTS

The following description is essentially only illustrative, rather than intending to limit the present application and the application or usage thereof. It should be appreciated that, throughout all drawings, similar reference signs indicate the same or similar parts or features. Each drawing only schematically shows the concept and principle of the embodiments of the present application, and does not necessarily show the specific dimensions and scales of the various embodiments of the present application, and specific drawings or specific parts of the drawings may be exaggerated to illustrate related details or structures of various embodiments of the present application.

In the description of the embodiments of the present application, the orientation terms related to "upper" and "lower" used herein are defined according to the upper and lower position relationship of the view shown in the accompanying drawings, and the terms "forward" and "reverse" used herein are defined according to the flow direction of the fluid. In the actual application of the electronic expansion valve or the valve needle assembly, the positional relationship of "upper" and "lower" and the flow direction of "forward" and "reverse" used herein may be defined according to actual conditions. These relationships and directions may be reversed.

Figure 1:
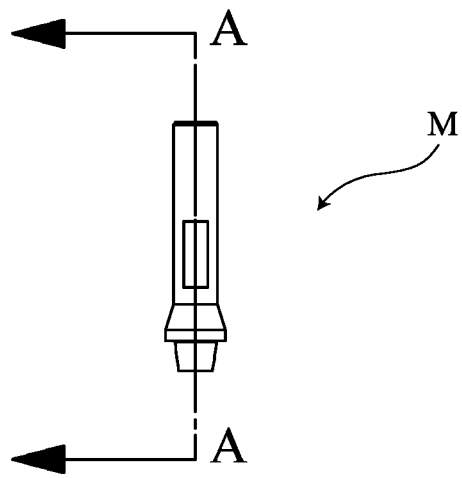
FIG. 1 is a schematic view of a valve needle assembly of an electronic expansion valve in the conventional technology.
Figure 2:
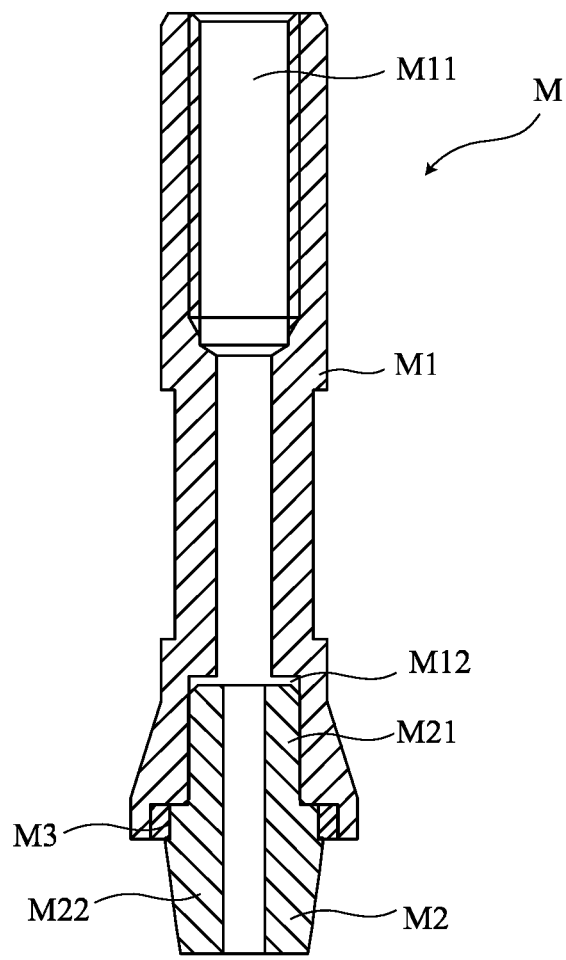
FIG. 2 is a sectional view of the valve needle assembly taken along the section line A-A in FIG. 1.
Figure 3:
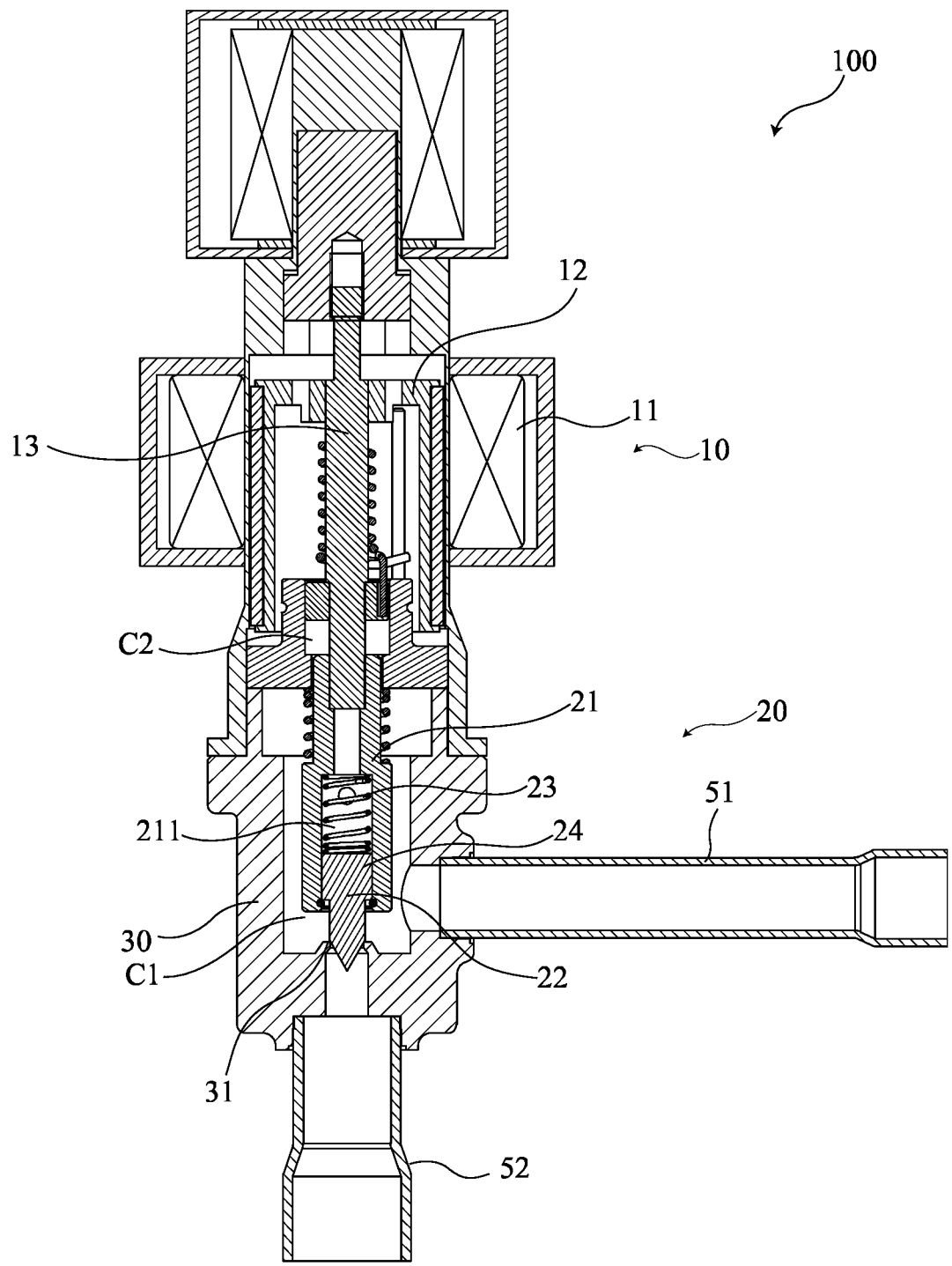
FIG. 3 is a sectional view of the electronic expansion valve in the conventional technology.

FIG. 3 is a sectional view of an electronic expansion valve 100 in the related art. The electronic expansion valve 100 mainly includes a drive mechanism 10, a valve needle assembly 20 and a valve seat 30. The drive mechanism 10 includes a stepper motor, and the stepper motor includes a stator 11 and a rotor 12. A spindle 13 is fixedly connected to the rotor 12, and the spindle 13 rotates integrally with the rotor 12. The valve needle assembly 20 includes a valve stem 21, a valve needle 22 and a spring 23. The spring 23 and an upper end 24 of the valve needle 22 are accommodated in an inner cavity 211 of the valve stem 21. An upper end of the spring 23 abuts against the upper part of the inner cavity 211 of the valve stem 21, a lower end of the spring 23 abuts against the upper end portion of the valve needle 22, and the spring 23 is configured to apply force to the valve needle 22. A lower end of the valve needle 22 protrudes from a lower end of the valve stem 21. The upper end of the valve stem 21 is operatively connected to the lower end of the spindle 13, so that the rotational movement of the spindle 13 is converted into the movement of the valve needle assembly 20 in the up-down direction (axial direction), and the lower end of the valve needle 22 cooperates with a valve hole 31 on the valve seat 30 to regulate the flow rate of the fluid passing through the electronic expansion valve 100.

In the valve needle assembly 20, the spring 23 applies force on the valve needle 22, and the valve needle 22 can move up and down relative to the valve stem 21 in the inner cavity 211 of the valve stem 21 under the force of the spring 23. The valve needle 22 is flexibly connected with the valve stem 21. In a case that there are position deviations caused by manufacturing or assembly errors in the electronic expansion valve 100, the valve needle 22 can overcome the elastic force of the spring 23 and move upward relative to the valve stem 21 in the inner cavity 211 of the valve stem 21, thereby providing axial flexibility and radial flexibility and avoiding the jamming phenomenon. Therefore, the requirements of the electronic expansion valve 100 on the manufacturing accuracy and assembly accuracy of various parts can be lowered.

In a case that the electronic expansion valve 100 is used as a two-way electronic expansion valve, in the forward flow state of the fluid, the fluid flows from a pipe 51 into a first chamber C1 in the valve seat 30 of the electronic expansion valve 100, and when the valve needle assembly 20 opens the valve hole 31 on the valve seat 30, the fluid flows out of the electronic expansion valve 100 from a pipe 52. In the reverse flow state of the fluid, when the valve needle assembly 20 opens the valve hole 31 on the valve seat 30, the fluid flows from the pipe 52 into the first chamber C1 in the valve seat 30 of the electronic expansion valve 100 and flows out of the electronic expansion valve from the pipe 51.

In the reverse flow state of the fluid, especially in the case of a large-diameter valve, the fluid applies an upward force on the lower end of the valve needle 22, which may overcome the force of the spring 23 and make the valve needle 22 to move upward. In the valve needle assembly 20, the upward movement distance of the valve needle 22 from overcoming the force of the spring 23 is limited by the stiffness of the spring 23. In addition, the axial flexibility provided by the spring 23 is not limited by other factors. However, the stiffness of the spring 23 cannot be set too large; otherwise there will be no points in providing axial flexibility and radial flexibility through the flexible connection. Therefore, when the valve hole 31 on the valve seat 30 is not required to be opened, the valve needle 22 may have overcome the force of the spring 23 under the force of the fluid and have moved upwards too far, causing the valve hole 31 to be opened in advance and causing internal leakage, so that the valve needle assembly cannot accurately control the flow rate of the fluid flowing through the electronic expansion valve in the reverse flow state of the fluid.

In view of the above problems, the inventor proposes the present inventive concept. In the present application, the axial flexibility of the electronic expansion valve is limited, so as to prevent the electronic expansion valve from opening the valve hole on the valve seat in advance due to the fluid force in the reverse flow state of the fluid and avoid internal leakage, so that the electronic expansion valve can accurately control the flow rate of the fluid flowing through the electronic expansion valve both in the forward state and in the reverse state.

Figure 4:
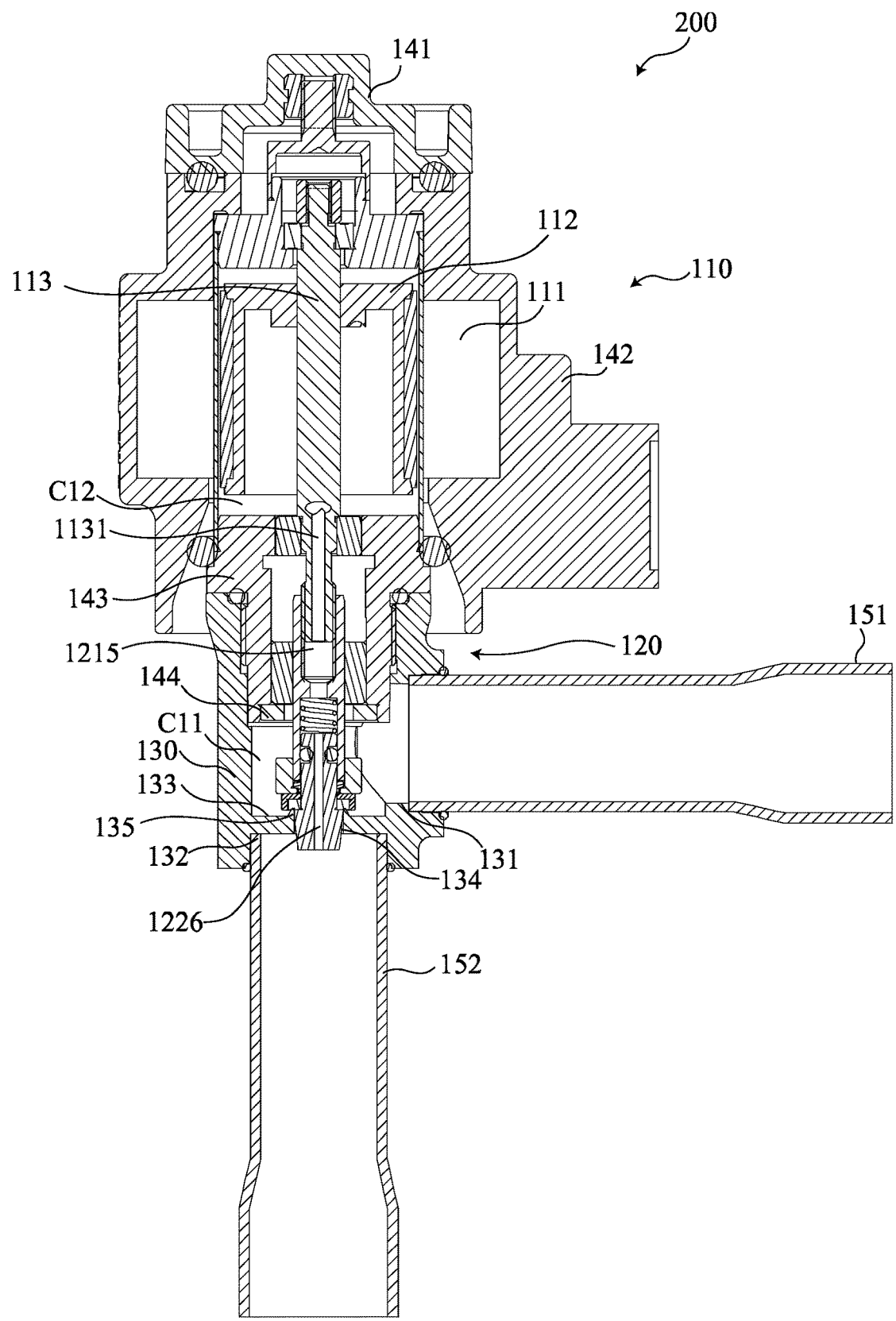
FIG. 4 is a sectional view of an electronic expansion valve according to the present application.
Figure 5:
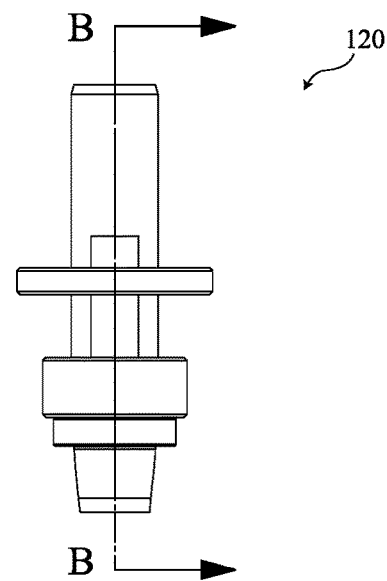
FIG. 5 is a schematic view of a valve needle assembly according to a first embodiment of the present application.
Figure 6:
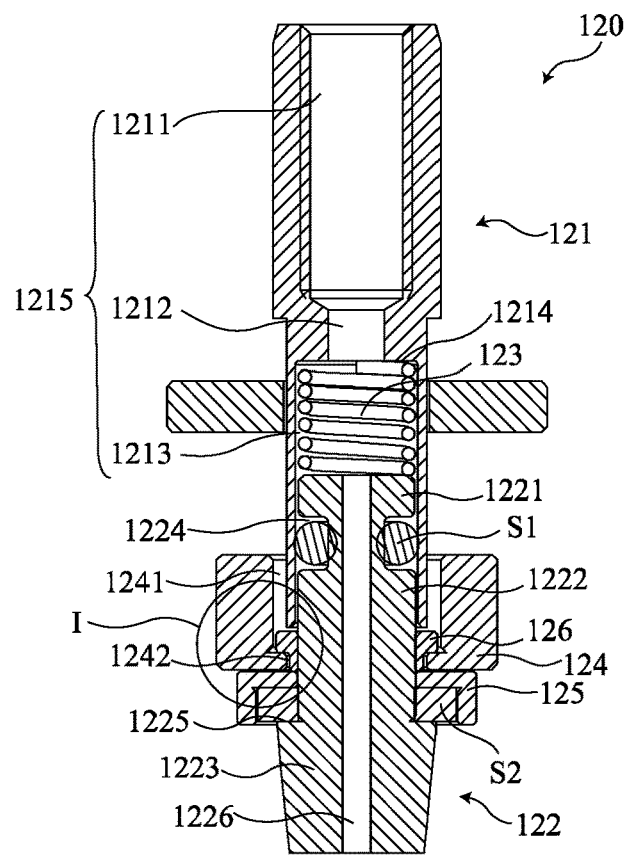
FIG. 6 is a sectional view of the valve needle assembly taken along the section line B-B in FIG. 5.
Figure 7:
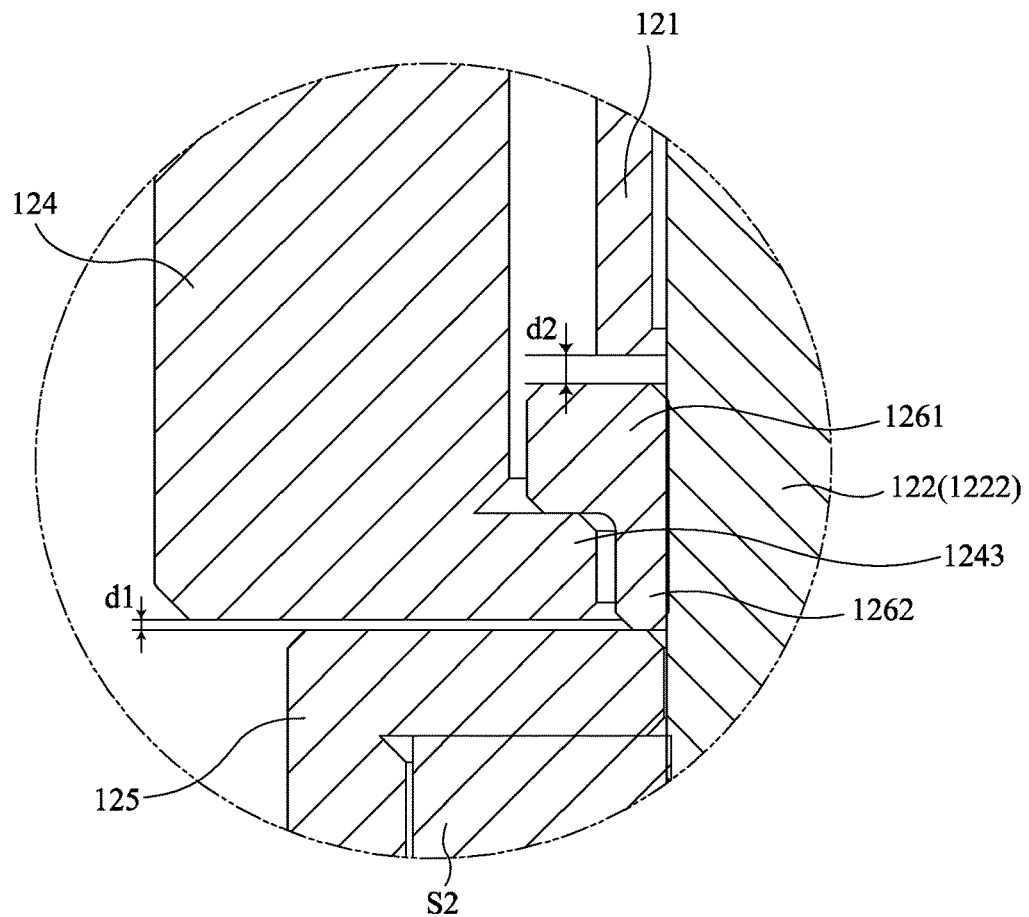
FIG. 7 is an enlarged view of the portion enclosed by circle I in FIG. 6.

An electronic expansion valve 200 according to a first embodiment of the present application is described below with reference to FIGS. 4 to 7. FIG. 4 is a sectional view of the electronic expansion valve 200, wherein the electronic expansion valve 200 is in a closed state. FIGS. 5 and 6 show a valve needle assembly 120 of the electronic expansion valve 200 in FIG. 4 in a closed state. FIG. 7 is a partial enlarged view of the valve needle assembly 120.

The electronic expansion valve 200 mainly includes a drive mechanism 110, a valve needle assembly 120 and a valve seat 130. The drive mechanism 110 is provided between an upper cover 141 and a support member 143, and is provided in a housing 142. The drive mechanism 110 includes a stepper motor, and the stepper motor includes a stator 111 and a rotor 112. A spindle 113 is fixedly connected to the rotor 112, and rotates integrally with the rotor 112.

The valve seat 130 is provided with a first port 131 and a second port 132. The first port 131 is connected with a pipe 151, and the second port 132 is connected to a pipe 152. One of the first port 131 and the second port 132 serves as a fluid inlet, and the other serves as a fluid outlet. A first chamber C11 is provided in the valve seat 130. The fluid flows into the first chamber C11 through the fluid inlet, and flows out of the electronic expansion valve from the fluid outlet. The first chamber C11 is in fluid communication with the first port 131, and the first chamber C11 is selectively in fluid communication with the second port 132 through a valve hole 134. The valve hole 134 is provided on a lateral portion of the valve seat 130 and cooperates with a valve needle to be described below to adjust the opening degree of the electronic expansion valve 200.

The valve needle assembly 120 is arranged between the support member 143 and the valve seat 130. An anti-rotation member 144 is provided between the valve needle assembly 120 and the support member 143. The valve needle assembly 120 includes a valve stem 121, a valve needle 122, an elastic member, a stop structure and sealing members. The elastic member is, for example, a spring 123. The sealing members include a chamber sealing member S1 and a valve hole sealing member S2. The stop structure is configured to limit the relative movement between the valve needle and the valve stem. Specifically, the stop structure includes a first stopper provided on the valve stem 121 and a second stopper provided on the valve needle 122. A predetermined axial gap may be provided between the first stopper and the second stopper, and the predetermined axial gap has a maximum value in the open state of the electronic expansion valve 200. The first stopper and the second stopper are adapted to abut against each other so as to limit the valve needle 122 from moving upward relative to the valve stem 121 (in a direction of opening the electronic expansion valve 200) in the closed state of the electronic expansion valve 200 to open the electronic expansion valve 200. The first stopper and the second stopper are components of the stop structure that first abut against each other during the relative movement between the valve stem 121 and the valve needle 122. Here, it should be noted that in the present description, the expression "limit the valve needle from moving upward relative to the valve stem to open the electronic expansion valve" covers both "the valve needle is prevented from moving upward relative to the valve stem" and "the valve needle is allowed to move upward by a predetermined distance relative to the valve stem, while keeping the electronic expansion valve closed". Moreover, in the present description, the closed state of the electronic expansion valve refers to a state in which the valve hole 134 on the valve seat is closed by the valve needle 122 so that the first chamber C11 is not in fluid communication with the second port 132.

A threaded hole 1211 is provided at an upper end of the valve stem 121, and is configured to form threaded engagement with an outer thread at a lower end of the spindle 113. Alternatively, an external thread may be provided at the upper end of the valve stem 121, and an internal thread may be provided at the lower end of the spindle 113. An inner hole 1212 is provided in the middle portion of the valve stem 121. An inner hole 1213 is provided at a lower portion of the valve stem 121, and the inner hole 1213 is an unthreaded hole. The diameter of the inner hole 1212 is smaller than the diameter of the inner hole 1213, so that a stepped portion 1214 is formed at the connection between the inner hole 1212 and the inner hole 1213. The spring 123 is compressed in the inner hole 1213, one end of the spring 123 abuts against the stepped portion 1214, and the other end of the spring 123 abuts against an upper end portion 1221 of the valve needle 122 to apply force to the valve needle 122.

The valve needle 122 includes an upper end portion 1221, a middle portion 1222, and a lower end portion 1223. The upper end portion 1221 and the middle portion 1222 of the valve needle 122 may have substantially same diameters. An annular groove 1224 is provided between the upper end portion 1221 and the middle portion 1222. At least part of the valve needle 122 is accommodated in the inner hole 1213 and is able to move up and down in the inner hole 1213. Specifically, the upper end portion 1221 and at least part of the middle portion 1222 of the valve needle 122 are accommodated in the inner hole 1213 and are able to move up and down in the inner hole 1213. The chamber sealing member S1 is accommodated in the annular groove 1224 and is press-fitted between the annular groove 1224 and the inner wall of the inner hole 1213 to provide a two-way seal. The lower end portion 1223 of the valve needle 122 has a truncated cone shape that matches the valve hole 134 on the valve seat 130, and the taper thereof can be set according to the flow characteristics of the electronic expansion valve. The diameter of the lower end portion 1223 of the valve needle 122 is gradually decreased from top to bottom, and the maximum diameter of the lower end portion 1223 is larger than the diameter of the middle portion 1222, so that a stepped portion 1225 is formed at the connection between the middle portion 1222 and the lower end portion 1223.

A valve stem connector 124 is fixedly installed (for example, by interference fit) to a lower end of the valve stem 121, so that the lower end of the valve stem 121 is located in the valve stem connector 124, and the lower end portion 1223 of the valve needle 122 protrudes from the valve stem connector 124. A hole 1241 and a hole 1242 are provided in the valve stem connector 124. The diameter of the hole 1241 is larger than the diameter of the hole 1242, so that a flange 1243 is formed at the connection between the hole 1241 and the hole 1242.

The sealing ring seat 125 is installed at the middle portion 1222 of the valve needle 122 and is close to the lower end portion 1223. The elastic valve hole sealing member S2 is compressed and installed between the sealing ring seat 125 and the stepped portion 1225, and, for example, may be in an over-compressed state. When the valve needle 122 closes the valve hole 134 on the valve seat 130, the valve hole sealing member S2 contacts a surface 133 of the valve seat 130. As shown in FIG. 4, a protrusion 135 surrounding the valve hole 134 is formed on the surface 133 of the valve seat 130. The outer diameter of the protrusion 135 is smaller than the inner diameter of the lower end of the sealing ring seat 125, so that in the closed state of the electronic expansion valve 200, the protrusion 135 is pressed against the valve hole sealing member S2.

An adjusting washer 126 is in interference fit with the middle portion 1222 of the valve needle 122. The adjusting washer 126 has an axial upper end 1261 with a larger diameter and an axial lower end 1262 with a smaller diameter. The axial upper end 1261 of the adjusting washer 126 is arranged on the flange 1243, so as to prevent the valve needle 122 from moving downward relative to the valve stem by an excessive displacement and escaping from the inner hole 1213. The axial upper end 1261 of the adjusting washer 126 constitutes a first anti-detachment portion, and the flange 1243 constitutes a second anti-detachment portion. The axial lower end 1262 of the adjusting washer 126 is located between the inner peripheral edge of the flange 1243 and the outer peripheral surface of the middle portion 1222 of the valve needle 122. In the closed state of the electronic expansion valve 200 shown in FIG. 4, the axial lower end 1262 of the adjusting washer 126 abuts against the upper surface of the sealing ring seat 125, so that the sealing ring seat 125 can still move integrally with the adjusting washer 126 and the valve needle 122, even if the sealing ring seat 125 is in clearance fit with the valve needle 122.

FIG. 7 is an enlarged view of the portion enclosed by circle I in FIG. 6. As shown in FIG. 7, in the closed state of the electronic expansion valve 200, a first axial gap d1 is formed between the top surface of the sealing ring seat 125 and the bottom surface of the valve stem connector 124, and a second axial gap d2 is formed between the lower end of the valve stem 121 and the top surface of the adjusting washer 126. The first axial gap d1 and the second axial gap d2 have the maximum values in the open state of the electronic expansion valve 200. In this exemplary embodiment, the first axial gap d1 and the second axial gap d2 in the closed state of the electronic expansion valve 200 are respectively equal to the first axial gap and the second axial gap in the open state of the electronic expansion valve 200.

In a case that the fluid flows in the forward direction, the fluid flows from the pipe 151 into the first chamber C11 of the electronic expansion valve 200. In a case that there are position deviations caused by manufacturing or assembly errors in the electronic expansion valve 200, the valve needle 122 can overcome the elastic force of the spring 123 and move upward relative to the valve stem 121 in the inner cavity 1213 of the valve stem 121, thereby providing axial flexibility and radial flexibility and avoiding jamming phenomenon, so that the electronic expansion valve 200 can operate normally. Therefore, the requirements of the electronic expansion valve 100 on the manufacturing accuracy and assembly accuracy of various parts can be lowered.

In a case that the fluid flows in the reverse direction, when the valve needle assembly 122 opens the valve hole 134, the fluid flows from the pipe 152 into the first chamber C11 of the electronic expansion valve 200 and flows out of the electronic expansion valve 200 from the pipe 151. The fluid in the pipe 152 applies an upward force on the valve needle 122. In the closed state of the electronic expansion valve 200, when the force applied by the fluid to the valve needle 122 overcomes the elastic force of the spring 123 to move the valve needle 122 upward (in the direction of opening the valve hole 134) relative to the valve stem 121, the sealing ring seat 125 and the adjusting washer 126 move upward together with the valve needle 122.

In the electronic expansion valve 200 of this embodiment, after the valve needle 122 moves upward relative to the valve stem 121 by the first axial distance, at least one of the first axial gap d1 and the second axial gap d2 is eliminated, and the upward movement of the valve needle 122 relative to the valve stem 121 is blocked, and the valve needle 122 cannot continue to move upward relative to the valve stem 121. At this time, the connection between the valve stem 121 and the valve needle 122 becomes a rigid connection.

Specifically, in a case that the first axial gap d1 is less than or equal to the second axial gap d2, after the valve needle 122 moves upwards relative to the valve stem 121 by the first axial distance, the first axial gap d1 is first eliminated, so that the top surface of the sealing ring seat 125 abuts against the bottom surface of the valve stem connector 124. Since the valve stem connector 124 is fixedly connected to the valve stem 121, the valve needle 122 cannot further move upward relative to the valve stem 121. At this time, the connection between the valve stem 121 and the valve needle 122 becomes a rigid connection, and the valve stem connector 124 and the sealing ring seat 125 constitute a stop structure for limiting the axial flexibility. At this time, the valve stem connector 124 constitutes the first stopper of the stop structure, and the sealing ring seat 125 constitutes the second stopper of the stop structure. In a case that the first axial gap d1 is equal to the second axial gap d2, when the bottom surface of the valve stem connector 124 abuts against the top surface of the sealing ring seat 125, the adjusting washer 126 abuts against the lower end of the valve stem 121 to form an additional stop structure. Alternatively, in a case that the first axial gap d1 is smaller than the second axial gap d2, when the bottom surface of the valve stem connector 124 abuts against the top surface of the sealing ring seat 125, the adjusting washer 126 and the lower end of the valve stem 121 keep spaced apart from each other.

Alternatively, in a case that the first axial gap d1 is greater than or equal to the second axial gap d2, after the valve needle 122 moves upwards relative to the valve stem 121 by the first axial distance, the second axial gap d2 is first eliminated, so that the top surface of the adjusting washer 126 abuts against the lower end of the valve stem 121, and the valve needle 122 cannot further move upward relative to the valve stem 121. At this time, the connection between the valve stem 121 and the valve needle 122 becomes a rigid connection. At this time, the lower end of the valve stem 121 constitutes the first stopper of the stop structure, and the adjusting washer 126 constitutes the second stopper of the stop structure. In a case that the first axial gap d1 is equal to the second axial gap d2, when the lower end of the valve stem 121 abuts against the top surface of the adjusting washer 126, the bottom surface of the valve stem connector 124 abuts against the top surface of the sealing ring seat 125 to form an additional stop structure. Alternatively, in a case that the first axial gap d1 is greater than the second axial gap d2, when the lower end of the valve stem 121 abuts against the top surface of the adjusting washer 126, the bottom surface of the valve stem connector 124 and the top surface of the sealing ring seat 125 keep spaced apart from each other.

In addition, during the upward movement of the valve needle 122 integrally with the sealing ring seat 126 and the adjusting washer 126 with respect to the valve stem 121, the elastic valve hole sealing member S2 stretches upward along with the sealing ring seat 126, but is still compressed between the sealing ring seat 125 and the protrusion 135 on the upper surface 133 of the lateral portion of the valve seat 130, and surrounds the valve hole 134, and can still provide a seal between the valve needle assembly 120 and the valve hole 134. Therefore, through the above-mentioned arrangement of the valve needle assembly 120, the valve needle 122 in the valve needle assembly 120 is able to move upwards relative to the valve stem 121 under the force of the fluid in the reverse flow state of the fluid, but the valve needle cannot move upwards without restriction. After the valve needle 122 moves upwards relative to the valve stem 121 by the first axial distance, the valve needle 122 does not further move upwards relative to the valve stem 121 to open the valve hole 134 in advance before the drive mechanism 110 drives the valve needle assembly 120 to open the valve hole 134, so that the valve hole 134 remains closed, thereby avoiding the above-mentioned internal leakage, so that the electronic expansion valve 200 can still operate normally in the reverse flow state of the fluid.

In the closed state of the electronic expansion valve 200 shown in FIG. 4, there is a predetermined axial gap between the first stopper and the second stopper (which refers to the smaller one of the first axial gap d1 between the top surface of the sealing ring seat 125 and the bottom surface of the valve stem connector 124 and the second axial gap d2 between the lower end of the valve stem 121 and the top surface of the adjusting washer 126), and the predetermined axial gap is equal to the axial gap between the first stopper and the second stopper in the open state of the electronic expansion valve 200. However, it should be noted herein that the electronic expansion valve 200 according to the present application may also be configured so that the predetermined axial gap between the first stopper and the second stopper in the closed state of the electronic expansion valve 200 is smaller than the axial gap of the electronic expansion valve 200 in the open state.

Specifically, during a process that the valve needle assembly 120 moves downward under the drive of a drive device 110 to close the valve hole 134, when the lower end portion 1223 of the valve needle 122 is fitted into the valve hole 134 and closes the valve hole 134, the valve stem 121 may be moved downward relative to the valve needle 122 as needed to reduce the first axial gap d1 and the second axial gap d2 or to eliminate at least one of the first axial gap d1 and the second axial gap d2. The valve stem 121 can move downward relative to the valve needle 122, so that the first axial gap d1 and the second axial gap d2 are reduced, so that the axial gap between the first stopper and the second stopper is reduced in the closed state of the electronic expansion valve 200. Therefore, in the closed state of the electronic expansion valve 200, the axial distance by which the valve needle 122 moves upward relative to the valve stem 121 is reduced, when the force of the fluid acting on the valve needle 122 overcomes the force of the spring 123.

The valve stem 121 can move further downward relative to the valve needle 122 to eliminate at least one of the first axial gap d1 and the second axial gap d2, so that in the closed state of the electronic expansion valve 200, the first stopper abuts against the second stopper, and the first stopper is prevented from moving upward relative to the second stopper. Similar to the above solution, in a case that the valve stem 121 moves downward relative to the valve needle 122 so that the first axial gap d1 is first eliminated, the top surface of the sealing ring seat 125 abuts against the bottom surface of the valve stem connector 124. The valve stem connector 124 constitutes the first stopper of the stop structure, and the sealing ring seat 125 constitutes the second stopper of the stop structure. When the bottom surface of the valve stem connector 124 abuts against the top surface of the sealing ring seat 125, the adjusting washer 126 abuts against the lower end of the valve stem 121 to form an additional stop structure. Alternatively, when the bottom surface of the valve stem connector 124 abuts against the top surface of the sealing ring seat 125, the adjusting washer 126 and the lower end of the valve stem 121 can keep spaced apart from each other. At this time, the valve stem 121 can further move downward relative to the valve needle 122, so that the valve stem connector 124 presses down the sealing ring seat 125 to further compress the valve hole sealing member S2, so that the sealing ring seat 125 is moved downward relative to the valve needle, and the second axial gap d2 is further reduced or even eliminated.

In a case that the valve stem 121 moves downward relative to the valve needle 122 so that the second axial gap d2 is first eliminated, the top surface of the adjusting washer 126 abuts against the lower end of the valve stem 121. The lower end of the valve stem 121 constitutes the first stopper of the stop structure, and the adjusting washer 126 constitutes the second stopper of the stop structure. When the lower end of the valve stem 121 abuts against the top surface of the adjusting washer 126, the bottom surface of the valve stem connector 124 abuts against the top surface of the sealing ring seat 125 to form an additional stop structure. Alternatively, when the lower end of the valve stem 121 abuts against the top surface of the adjusting washer 126, the bottom surface of the valve stem connector 124 and the top surface of the sealing ring seat 125 can keep spaced apart from each other.

The test data shows that through the above configuration, the maximum working pressure difference of the electronic expansion valve can be increased, which is particularly effective for the working pressure difference in the reverse flow state, in which the working pressure difference in the reverse flow state can be increased by 1.5 to 5 times.

In addition, compared with the electronic expansion valve 100 shown in FIG. 3 in the related art, the electronic expansion valve 200 according to the present application further has other advantages. Since the drive mechanism drives the valve needle assembly to reciprocate up and down during the operation of the electronic expansion valve, a second chamber C2 is located between the drive mechanism and the valve needle assembly, as shown in FIG. 3. The fluid flowing into the first chamber C1 enters the second chamber C2 through the fitting clearances between related parts in the electronic expansion valve 100. While the valve needle assembly 20 moves upward or downward under the drive of the drive mechanism 10, the volume of the second chamber C2 changes, thereby forming a back pressure chamber that affects the movement of the valve needle assembly 20. While the valve needle assembly 20 moves upward under the drive of the drive mechanism 10 to open the valve hole 31, the volume of the second chamber C2 becomes smaller. This causes the fluid in the second chamber C2 to apply a relatively large downward force on the valve needle assembly 20, thus a relatively large driving force is required to move the valve needle assembly 20 upward to open the valve hole 31. While the valve needle assembly 20 moves downward under the drive of the drive mechanism 10 to close the valve hole 31, the volume of the second chamber C2 becomes larger, and the downward force of the fluid in the second chamber C2 acting on the valve needle assembly 20 is reduced, so that a large driving force is required to move the valve needle assembly 20 downward to close the valve hole 31. This generally results in an overlarge drive mechanism, and the cost is too high.

The electronic expansion valve 200 according to the present application further solves the above-mentioned problems and can effectively reduce the required driving force, thereby reducing the power requirement on the drive mechanism and reducing the cost.

In the electronic expansion valve 200, as shown in FIG. 4, the second chamber C12 is located between the drive mechanism 110 and the valve needle assembly 120. While the valve needle assembly 120 moves upward or downward under the drive of the drive mechanism 110, the volume of the second chamber C12 changes. The second chamber C12 forms a back pressure chamber that affects the movement of the valve needle assembly 120. The second chamber C12 is sealed from the first chamber C11 by the chamber sealing member S1.

In order to effectively balance the force of the second chamber C12 on the valve needle assembly 120, the electronic expansion valve 200 is provided with a balance passage, which communicates the second chamber C12 with the second port 132.

As described above, the valve stem 121 is formed with a threaded hole 1211, an inner hole 1212, and an inner hole 1213 which are in communication with each other. The threaded hole 1211, the inner hole 1212, and the inner hole 1213 form a valve stem passage 1215 that passes through the valve stem 121 in the axial direction. As shown in FIG. 4, a spindle passage 1131 is provided in the spindle 113, and includes an axially extending portion and a radially extending portion (not shown). The spindle passage 1131 is in communication with the second chamber C12 in the electronic expansion valve 200. In addition, as shown in FIGS. 4 and 6, a valve needle passage 1226 is provided in the valve needle 122. The valve needle passage 1226 passes through the valve needle 122 in the axial direction, one end of the valve needle passage 1226 communicates with the second port 132 and the pipe 152, and the other end of the valve needle passage 1226 communicates with the inner hole 1213 of the valve stem 121. The spindle passage 1131, the valve stem passage 1215, and the valve needle passage 1226 communicate with each other to form the above-mentioned balance passage.

While the valve needle assembly 120 moves upward under the drive of the drive mechanism 110 to open the valve hole 134, the fluid in the second chamber C12 flows into the pipe 152 through the above-mentioned balance passage as the volume of the second chamber C12 decreases, so that the downward force of the fluid in the second chamber C12 acting on the valve needle assembly 120 is effectively reduced, and the driving force for making the valve needle assembly 120 to move upward can be reduced. While the valve needle assembly 120 moves downward under the drive of the drive mechanism 110 to close the valve hole 134, part of the fluid in the pipe 152 flows into the second chamber C12 through the above-mentioned balance passage, so that the downward force of the fluid in the second chamber C12 acting on the valve needle assembly 120 is increased, and the driving force for making the valve needle assembly 120 to move downward can be reduced. Therefore, through the provision of the balance passage, the actual forces acting on the valve needle assembly 120 can be effectively balanced, and the driving force required to drive the valve needle assembly 120 can be reduced, thereby reducing the power of the drive mechanism and reducing the cost.

Here, it should be noted that in this embodiment, it is shown that the relative movement between the valve needle and the valve stem can be restricted by eliminating one or both of the first axial gap d1 and the second axial gap d2. From the perspective of facilitating measurement and control, the relative movement between the valve needle and the valve stem can be restricted by just eliminating the first axial gap d1.

In this embodiment, the adjusting washer 126 is shown. However, the adjusting washer 126 is not necessary. In other embodiments according to the inventive concept of the present application, the adjusting washer 126 may be omitted, and corresponding anti-detachment portions are provided on the valve stem 121 and the valve needle 122 to prevent the valve needle 122 from moving downward relative to the valve stem 121 by an excessive displacement, which may otherwise cause the chamber sealing member and the valve needle to escape from valve stem 121. This arrangement can also achieve the similar technical effects described above. In a case that the adjusting washer 126 is not provided, the sealing ring seat may be in interference fit with the valve needle to move integrally with the valve needle.

Figure 8:
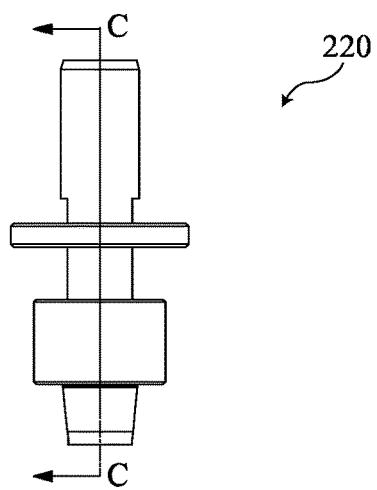
FIG. 8 is a schematic view of the valve needle assembly according to a second embodiment of the present application.

The valve needle assembly 220 according to a second embodiment of the present application will be described hereinafter with reference to FIGS. 8 to 10. Except for the valve needle assembly 220, other structures of the electronic expansion valve including the valve needle assembly 220 are substantially the same as or similar to the structure of the electronic expansion valve 200, and the description will not be repeated here. The following description mainly focuses on the valve needle assembly 220.

Similar to the valve needle assembly 120, the valve needle assembly 220 includes a valve stem 221, a valve needle 222, an elastic member, sealing members, and a stop structure. The elastic member is, for example, a spring 223. The sealing members include a chamber sealing member S21 and a valve hole sealing member S22. The stop structure is configured to limit the relative movement between the valve needle and the valve stem. Specifically, the stop structure includes a first stopper provided on the valve stem 221 and a second stopper provided on the valve needle 222. A predetermined axial gap may be provided between the first stopper and the second stopper, and the predetermined axial gap has a maximum value in the open state of the electronic expansion valve 200. The first stopper and the second stopper are adapted to abut against each other so as to limit the valve needle 222 from moving upward relative to the valve stem 221 (in a direction of opening the electronic expansion valve) to open the electronic expansion valve in the closed state of the electronic expansion.

A threaded hole 2211 is provided at an upper end of the valve stem 221, and is configured to form threaded engagement with an outer thread at a lower end of the spindle. An inner hole 2212 is provided in the middle portion of the valve stem. An inner hole 2213 is provided at a lower portion of the valve stem. The inner hole 2213 is an unthreaded hole. The diameter of the inner hole 2212 is smaller than the diameter of the inner hole 2213, so that a stepped portion 2214 is formed at the connection between the inner hole 2212 and the inner hole 2213. The spring 223 is accommodated in the inner hole 2213, one end of the spring 223 abuts against the stepped portion 2214, and the other end of the spring 223 abuts against an upper end portion 2221 of the valve needle 222 to apply force to the valve needle 222.

The valve needle 222 includes an upper end portion 2221, a middle portion 2222, and a lower end portion 2223. The upper end portion 2221 and the middle portion 2222 of the valve needle 222 may have same diameters. An annular groove 2224 is provided between the upper end portion 2221 and the middle portion 2222. At least part of the valve needle 222 is accommodated in the inner hole 2213 and is able to move up and down in the inner hole 2213. Specifically, the upper end portion 2221 and at least part of the middle portion 2222 of the valve needle 222 are accommodated in the inner hole 2213 and are able to move up and down in the inner hole 2213. The chamber sealing member S21 is accommodated in the annular groove 2224 and is press-fitted between the annular groove 2224 and the inner wall of the inner hole 2213 to provide a two-way seal. The lower end portion 2223 of the valve needle 222 has a truncated cone shape that matches the valve hole on the valve seat, and the taper thereof can be set according to the flow characteristics of the electronic expansion valve. The diameter of the lower end portion 2223 of the valve needle 222 is gradually decreased from top to bottom, and the maximum diameter of the lower end portion 2223 is larger than the diameter of the middle portion 2222, so that a stepped portion 2225 is formed at the connection between the middle portion 2222 and the lower end portion 2223.

The valve needle assembly 220 has a valve needle connector 224. As shown in FIG. 9, the cross section of the valve needle connector 224 is generally H-shaped. The valve needle connector 224 is integrally formed with an axial outer peripheral wall portion 2241 and a traverse wall portion 2242, and a through hole 2243 is provided on the traverse wall portion 2242. The valve needle connector 224 is fixed on the valve needle 222 through the interference fit between the through hole 2243 and the middle portion 2222 of the valve needle 222, so that the valve needle connector 224 and the valve needle 222 move integrally. The traverse wall portion 2242 divides the interior of the outer peripheral wall portion 2241 into an upper recess and a lower recess. The valve hole sealing member S22 is installed in the lower recess and compressed between the valve needle connector 224 and the lower end 2223 of the valve needle 222, for example, may be in an over-compressed state. When the valve needle 222 closes the valve hole on the valve seat, the valve hole sealing member S22 contacts the top surface of the lateral portion of the valve seat, and the protrusion on the top surface of the lateral portion of the valve seat presses against the valve hole sealing member S2 to seal the valve hole. In addition, a first anti-detachment portion is provided at the upper end of the valve needle connector 224, and a second anti-detachment portion is provided on the outer peripheral surface of the valve stem 221. The first anti-detachment portion is adapted to cooperate with the second anti-detachment portion to prevent the valve needle 222 from moving downward too far relative to the valve stem 221, which may otherwise cause the chamber sealing member S21 and the valve needle 222 to escape from the valve stem 221. The first anti-detachment portion is, for example, a barb portion 2243 formed on the inner circumference of the upper end of the valve needle connector 224, and the second anti-detachment portion is, for example, a hook portion 2216 formed on the outer peripheral surface of the valve stem 221 and cooperating with the barb portion 2243. Through the cooperation of the barb portion 2243 and the above-mentioned hook portion 2216 on the outer peripheral surface of the valve stem 221, it is possible to prevent the valve needle 222 from moving downward too far in the axial direction relative to the valve stem 221, which may otherwise cause the chamber sealing member S21 and the valve needle 222 to escape from the inner hole 2213 of the valve stem 221.

Figure 9:
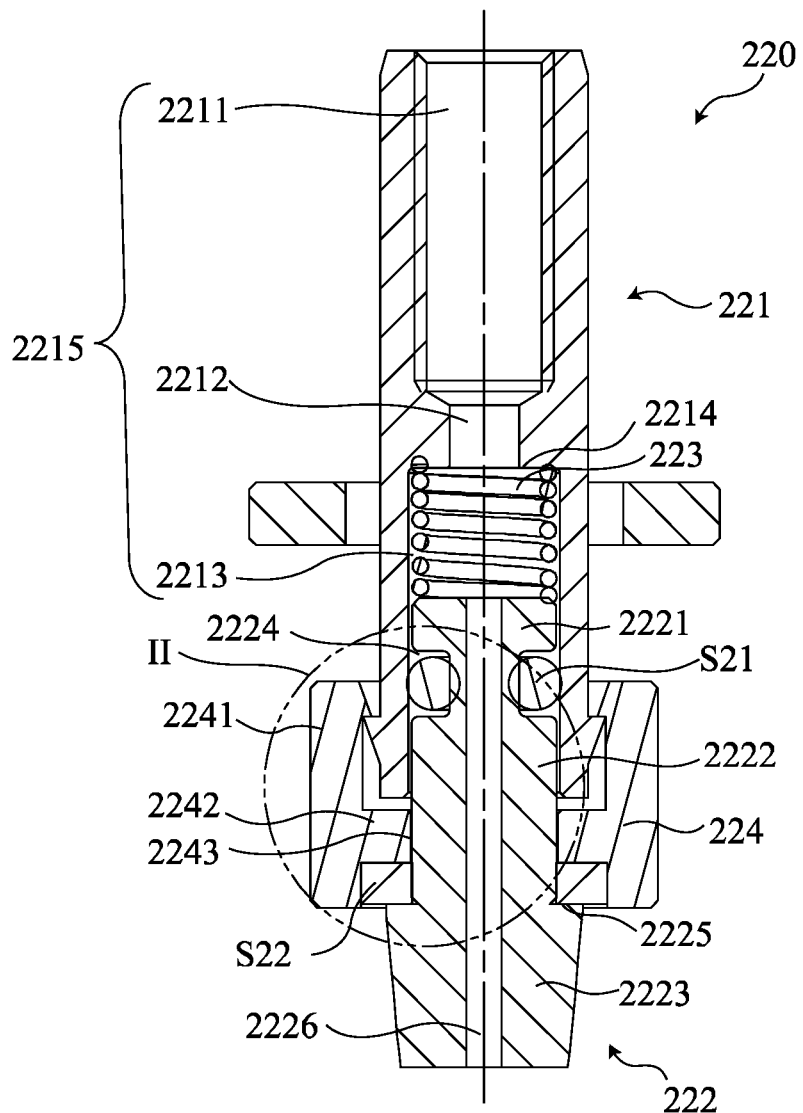
FIG. 9 is a sectional view of the valve needle assembly taken along the section line C-C in FIG. 8.
Figure 10:
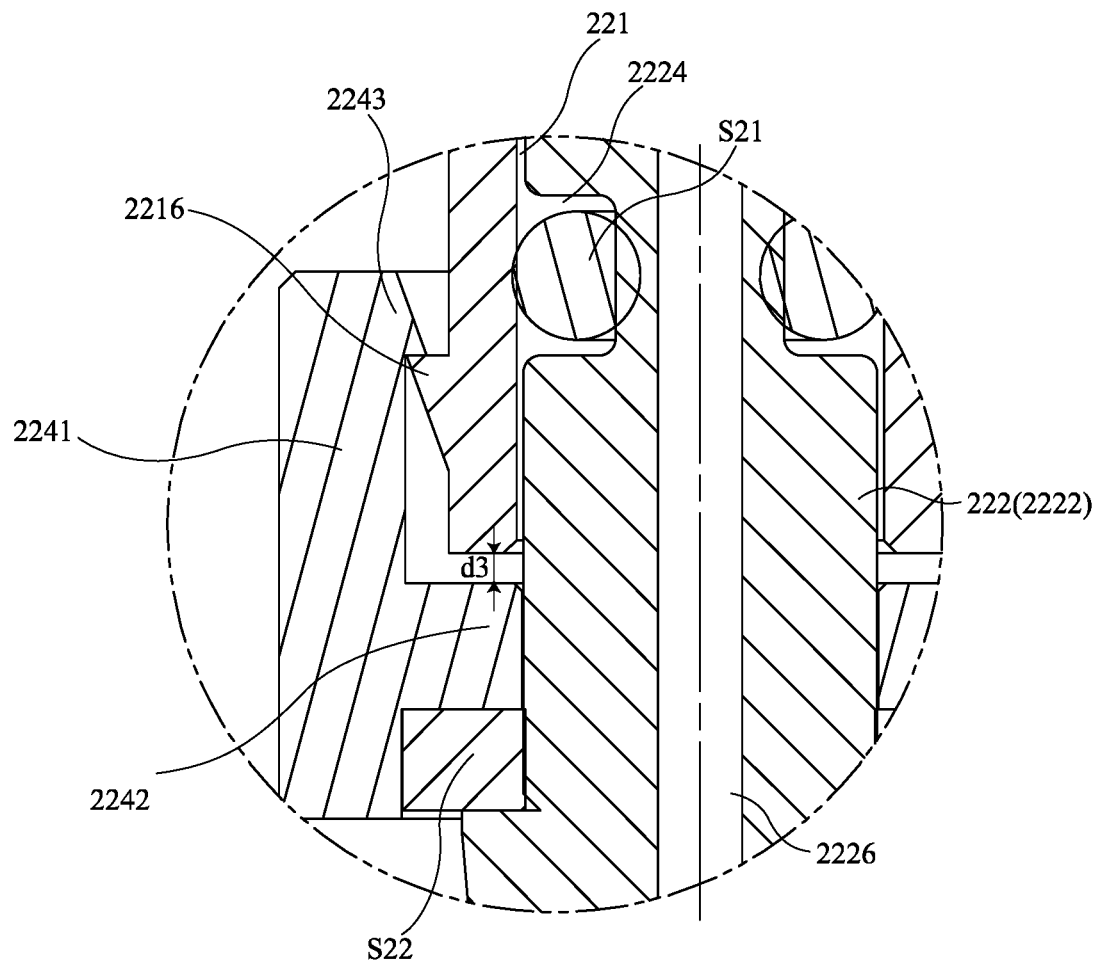
FIG. 10 is an enlarged view of the part enclosed by circle II in FIG. 9.

FIG. 10 is an enlarged view of the portion enclosed by circle II in FIG. 9. As shown in FIG. 10, in the valve needle assembly 220, a third axial gap d3 is provided between the top surface of the traverse wall portion 2242 of the valve needle connector 224 and the lower end of the valve stem 221. The third axial gap d3 has the maximum value in the open state of the electronic expansion valve. In this embodiment, the lower end of the valve stem 221 constitutes the first stopper of the stopper structure, and the valve needle connector 224 (more specifically, the traverse wall portion 2242 of the valve needle connector 224) constitutes the second stopper of the stopper structure.

The valve needle assembly 220 may be such configured that, in the closed state of the electronic expansion valve, the third axial gap d3 between the top surface of the traverse wall portion 2242 of the valve needle connector 224 and the lower end of the valve stem 221 is the maximum, that is, the third axial gap d3 in the closed state of the electronic expansion valve is equal to the third axial gap in the open state of the electronic expansion valve. Alternatively, similar to the valve needle assembly 120, the valve needle assembly 220 can also be configured so that, while the valve needle assembly 220 moves downward under the drive of the drive mechanism of the electronic expansion valve to close the valve hole, the valve stem 221 is moved downward relative to the valve needle 222 to reduce or eliminate the third axial gap d3 when the lower end 2223 of the valve needle 222 is fitted into the valve hole to close the valve hole, so that the third axial gap d3 in the closed state of the electronic expansion valve is smaller than the third axial gap in the open state of the electronic expansion valve. While the valve stem 221 moves downward relative to the valve needle 222 to eliminate the third axial gap d3, the top surface of the traverse wall portion 2242 of the valve needle connector 224 abuts against the lower end of the valve stem 221, so that the valve needle 222 is prevented from moving upward relative to the valve stem 221.

Similar to the electronic expansion valve 200, in the forward flow state of the fluid, the fluid flows from the first port on the valve seat into the electronic expansion valve having the valve needle assembly 220, and flows out of the electronic expansion valve from the second port. In a case that there are position deviations caused by manufacturing or assembly errors in the electronic expansion valve, the valve needle 222 can overcome the elastic force of the spring 223 and move upward relative to the valve stem 221 in the inner hole 2213 of the valve stem 221, thereby providing axial flexibility and radial flexibility and avoiding jamming phenomenon, so that the electronic expansion valve can operate normally. Therefore, the requirements of the electronic expansion valve on the manufacturing accuracy and assembly accuracy of various parts can be lowered.

Similarly, in the reverse flow state of the fluid, the fluid flows into the electronic expansion valve having the valve needle assembly 220 from the second port of the valve seat when the valve needle 222 opens the valve hole. In a case that the valve needle assembly 220 is configured so that there is a third axial gap d3 between the top surface of the traverse wall portion 2242 of the valve needle connector 224 and the lower end of the valve stem 221 in the closed state of the electronic expansion valve, the valve needle connector 224 in interference fit with the valve needle 222 moves upward together with the valve needle 222, when the valve needle 222 overcomes the force of the spring 223 and moves upward relative to the valve stem 221 under the force of the fluid. After the valve needle 222 moves upward by the second axial distance, the third axial gap d3 is eliminated, the top surface of the traverse wall portion 2242 of the valve needle connector 224 abuts against the lower end of the valve stem 221, and the valve needle 222 cannot further move upward relative to the valve stem 221. At this time, the connection between the valve stem 221 and the valve needle 222 becomes a rigid connection. The second axial distance may be the same as or different from the first axial distance.

During the upward movement of the valve needle 222 integrally with the valve needle connector 224 with respect to the valve stem 221, the elastic valve hole sealing member S22 extends upward along with the valve needle connector 224, but still abuts against the protrusion on the lateral portion of the valve seat and is compressed between the valve needle connector 224 and the protrusion of the lateral portion of the valve seat, and surrounds the valve hole, and can still provide a seal between the valve needle assembly 220 and the valve hole. In a case that the valve needle assembly 220 is such configured that the top surface of the traverse wall portion 2242 of the valve needle connector 224 abuts against the lower end of the valve stem 221 in the closed state of the electronic expansion valve, as long as the drive mechanism of the electronic expansion valve does not drive the valve needle assembly 220 to move upward to open the valve hole, the valve needle 222 cannot move upward relative to the valve stem 221, even if the force of the fluid is greater than the force of the spring 223.

Through the above-mentioned arrangement of the valve needle assembly 220, the valve needle 222 is prevented to move upwards relative to the valve stem 221 in the reverse flow state of the fluid, or the valve needle 222 is able to move upward relative to the valve stem 221 but cannot move upwards without restriction. When the third axial gap d3 is eliminated, the valve needle 222 will not further move upwards relative to the valve stem to open the valve hole in advance before the drive mechanism drives the valve needle assembly 220 to open the valve hole, so that the valve hole remains closed, thereby avoiding the above-mentioned internal leakage. Therefore, the electronic expansion valve can still operate normally in the reverse flow state of the fluid.

In addition, similar to the valve needle assembly 120, in the valve needle assembly 220, a valve needle passage 2226 is provided in the valve needle 222. The valve needle passage 2226 passes through the valve needle 222 in the axial direction and is in fluid communication with the second port on the valve seat. The threaded hole 2211, the inner hole 2212, and the inner hole 2213 of the valve stem 221 together form a valve stem passage 2215 that passes through the valve stem 221 in the axial direction. The valve needle passage 2226, the valve stem passage 2215 and the spindle passage formed on the spindle together constitute a balance passage to realize fluid communication of the second chamber between the drive mechanism and the valve needle assembly in the electronic expansion valve with the second port on the valve seat, thereby effectively balancing the actual forces on the valve needle assembly 220 and reducing the driving force required to drive the valve needle assembly 220.

Therefore, the valve needle assembly 220 according to the second embodiment can achieve the similar technical effects as that of the valve needle assembly 120 according to the first embodiment.

In addition, compared with the valve needle assembly 120, the valve needle connector 224 in the valve needle assembly 220 of the second embodiment can be used as a stopper, and can also be used as an anti-detachment portion and an installation portion of the valve hole sealing member. Therefore, there is no need to provide the adjusting washer 126 and the sealing ring seat for the valve needle assembly 220, and the structure is more compact.

It should be noted herein that, although in the second embodiment, it is shown that the valve needle connector 224 has a substantially H-shaped cross section, has the integrally formed outer peripheral wall portion 2241 and transverse wall portion 2242, and the outer diameter of the outer peripheral wall 2241 is uniform on the entire outer peripheral wall 2241, so that the outer peripheral surface of the outer peripheral wall portion 2241 is substantially flush in the axial direction, and the traverse wall portion 2242 is substantially perpendicular to the outer peripheral wall portion 2241 and has substantially the same thickness, so that the traverse wall portion 2242 is substantially flat. But the present application is not limited thereto. In other possible embodiments of the present application, a stepped portion may be formed on the outer peripheral wall portion 2241 and/or the traverse wall portion 2242. For example, the outer diameters of each portion of the outer peripheral wall portion 2241 in the axial direction may be different to form the stepped portion. For example, the traverse wall portion 2242 may have different thicknesses in the radial direction, thereby forming the stepped portion. Alternatively, the traverse wall portion 2242 may be inclined and not perpendicular to the outer peripheral wall portion 2241. These modified examples can still achieve similar technical effects as described above.

In addition, in the embodiments shown above, at least part of the valve needle is arranged inside the valve stem, so as to move relative to the valve stem inside the valve stem. But the present application is not limited thereto. The inventive concept of the present application can also be applied to a design of a valve needle assembly in which the end of the valve stem is arranged inside the valve needle so that the valve needle moves along the outer peripheral surface of the valve stem relative to the valve stem. In addition, in the embodiments shown above, it has been described that the valve needle assembly is provided with the chamber sealing member and the valve hole sealing member. However, it is conceivable that the chamber sealing member may be omitted (especially in a case that the balance passage is not provided). On the other hand, it is also possible to omit the valve hole sealing member or adopt other suitable alternative sealing structures. For example, in a case that the valve is closed by the abutment of the first stopper and the second stopper, the valve hole sealing member may be omitted. For another example, even in a case that the valve is closed with the first stopper and the second stopper being spaced apart by a predetermined axial gap, the electronic expansion valve can be kept closed even if the valve needle moves upward by a certain distance, by providing the lower end of the valve needle and the valve hole of valve seat having special shapes and/or having flexibility.

The exemplary embodiments of the present application have been described in detail, but it should be understood that the present application is not limited to the specific embodiments described and shown in detail above. Without departing from the spirit and scope of the present application, those skilled in the art can make various modifications and variations to the present application. All the variations and modifications are within the scope of the present application. Moreover, all of the components described herein can be replaced by other technically equivalent components.

The invention claimed is:

1. A valve needle assembly for an electronic expansion valve, comprising:
    a valve stem adapted to move in an axial direction under drive of a drive mechanism of the electronic expansion valve;
    a valve needle coupled with the valve stem so that the valve needle is movable in the axial direction relative to the valve stem;
    an elastic member arranged between the valve stem and the valve needle and adapted to apply force to the valve needle; and
    a stop structure comprising a first stopper arranged on the valve stem and a second stopper arranged on the valve needle, a maximum value of an axial gap between the first stopper and the second stopper in a closed state of the electronic expansion valve being less than or equal to an axial sealing distance of the valve needle and a valve hole of the electronic expansion valve, and the first stopper and the second stopper being adapted to abut against each other to limit the valve needle from moving relative to the valve stem in a first direction of opening the electronic expansion valve to open the electronic expansion valve in the closed state of the electronic expansion valve.

2. The valve needle assembly according to claim 1, wherein the first stopper is a valve stem connector fixed on the valve stem, and the second stopper is a sealing ring seat provided on the valve needle, and the sealing ring seat and the valve needle are integrally movable in the axial direction.

3. The valve needle assembly according to claim 2, wherein the valve needle assembly further comprises an adjusting washer that is fixed on the valve needle and is arranged between a lower end of the valve stem and the sealing ring seat in the axial direction, and the valve needle assembly is configured so that: when the valve needle moves in the first direction relative to the valve stem to make the first stopper to abut against the second stopper, the adjusting washer abuts against the lower end of the valve stem to form an additional stop structure, or the adjusting washer and the lower end of the valve stem are spaced apart.

4. The valve needle assembly according to claim 3, wherein the sealing ring seat is in clearance fit with the valve needle, and an axial lower end of the adjusting washer is able to abut against the sealing ring seat to make the sealing ring seat and the valve needle to integrally move in the axial direction.

5. The valve needle assembly according to claim 3, wherein the adjusting washer is provided with a first anti-detachment portion, a second anti-detachment portion is provided at a lower end of the valve stem connector, and the first anti-detachment portion is adapted to cooperate with the second anti-detachment portion to limit the valve needle from moving relative to the valve stem in a second direction opposite to the first direction.

6. The valve needle assembly according to claim 3, wherein a valve hole sealing member is compressed between the sealing ring seat and the valve needle, and in the closed state of the electronic expansion valve, the valve hole sealing member seals the valve hole of the electronic expansion valve.

7. The valve needle assembly according to claim 2, wherein a valve hole sealing member is compressed between the sealing ring seat and the valve needle, and in a closed state of the electronic expansion valve, the valve hole sealing member seals the valve hole of the electronic expansion valve.

8. The valve needle assembly according to claim 1, wherein the first stopper is a lower end of the valve stem, and the second stopper is an adjusting washer fixed on the valve needle.

9. The valve needle assembly according to claim 8, wherein the valve needle assembly further comprises a valve stem connector and a sealing ring seat, the valve stem connector is fixed on the valve stem, the sealing ring seat is installed on the valve needle and located below the adjusting washer and the valve stem connector in the axial direction, and the sealing ring seat and the valve needle are integrally movable in the axial direction, and the valve needle assembly is configured so that: when the valve needle moves in the first direction relative to the valve stem to make the first stopper to abut against the second stopper, the valve stem connector abuts against the sealing ring seat to form an additional stop structure, or the valve stem connector and the sealing ring seat are spaced apart.

10. The valve needle assembly according to claim 9, wherein a valve hole sealing member is compressed between the sealing ring seat and the valve needle, and in the closed state of the electronic expansion valve, the valve hole sealing member seals the valve hole of the electronic expansion valve.

11. The valve needle assembly according to claim 9, wherein the sealing ring seat is in clearance fit with the valve needle, and an axial lower end of the adjusting washer is able to abut against the sealing ring seat to make the sealing ring seat and the valve needle to integrally move in the axial direction.

12. The valve needle assembly according to claim 9, wherein the adjusting washer is provided with a first anti-detachment portion, a second anti-detachment portion is provided at a lower end of the valve stem connector, and the first anti-detachment portion is adapted to cooperate with the second anti-detachment portion to limit the valve needle from moving relative to the valve stem in a second direction opposite to the first direction.

13. The valve needle assembly according to claim 1, wherein the first stopper is a lower end of the valve stem, and the second stopper is a valve needle connector fixed on the valve needle, the valve needle connector is integrally formed with an outer peripheral wall portion and a traverse wall portion, and the traverse wall portion divides the interior of the outer peripheral wall portion into an upper recess and a lower recess.

14. The valve needle assembly according to claim 13, wherein a first anti-detachment portion is provided at an axial upper end of the outer peripheral wall portion, a second anti-detachment portion is provided on the valve stem, and the first anti-detachment portion is adapted to cooperate with the second anti-detachment portion to limit the valve needle from moving relative to the valve stem in a second direction opposite to the first direction.

15. The valve needle assembly according to claim 13, wherein a valve hole sealing member is installed in the lower recess, the valve hole sealing member is compressed between the traverse wall portion and the valve needle, and in a closed state of the electronic expansion valve, the valve hole sealing member seals the valve hole of the electronic expansion valve.

16. The valve needle assembly according to claim 1, wherein at least part of the valve needle is arranged in an inner cavity of the valve stem.

17. The valve needle assembly according to claim 1, wherein a valve needle passage is provided in the valve needle and passes through the valve needle in the axial direction, and a valve stem passage is provided in the valve stem, passes through the valve stem in the axial direction and is in fluid communication with the valve needle passage.

18. The valve needle assembly according to claim 1, wherein an annular groove is provided on the valve needle, in which a chamber sealing member is provided, and the chamber sealing member is compressed between the valve needle and the valve stem.

19. An electronic expansion valve, comprising: a valve seat comprising a first port and a second port, wherein one of the first port and the second port is used as a fluid inlet, the other of the first port and the second port is used as a fluid outlet, the valve seat further comprises a first chamber and the valve hole, the first chamber is in fluid communication with the first port, and the first chamber is selectively in fluid communication with the second port through the valve hole; the valve needle assembly according to claim 1; and a drive mechanism driving the valve needle assembly to reciprocate to make the valve needle to cooperate with the valve hole so as to adjust an opening degree of the valve hole.

20. The electronic expansion valve according to claim 19, wherein a second chamber is defined between a motor of the drive mechanism and the valve needle assembly, and a spindle passage is provided in a spindle of the drive mechanism, the spindle passage is in fluid communication with a valve stem passage formed in the valve stem and a valve needle passage formed in the valve needle to form a balance passage that communicates the second chamber with the second port.

* * * * *